Patented Feb. 20, 1951

2,542,353

UNITED STATES PATENT OFFICE 2,542,353

METHOD OF MAKING RETRACTILE ARTICLES

René Picard, Paris, and André Bonnet, Vaulx-en-Velin, France, assignors, by mesne assignments, to Societe Novacel, Paris, France, a corporation of France No Drawing. Application February 26, 1948, Serial No. 11,325. In France September 21, 1939

Section 1, Public Law 690, August 8, 1946
Patent expires September 21, 1959

1 Claim. (Cl. 18—58.4)

This invention relates to a method of making retractile articles formed of a synthetic resin. More particularly, it relates to retractile articles, such as caps, bands and the like, formed of vinyl resins and to the method of making the same.

Retractile articles, such as caps, bands, etc., formed of polymerized vinyl derivatives have been prepared by coagulating with water a layer of a solution comprising a water-insoluble polymerized vinyl derivative dissolved in a water-miscible organic solvent and adhering to an appropriate mold which had been dipped in said solution. Such articles have the property of shrinking upon conversion from a wet or gel state to the dry state and of firmly adhering to the article on which they have been applied. Such articles, and particularly caps and bands, have been used to a great extent on bottle closures or on bottle necks. According to the prior art, the article, such as a cap or band, while in the wet, moist or slightly swollen state, was applied to the desired article as, for example, over the closure or on the neck of the bottle and converted to the dry state. Upon drying, the cap or band shrank or contracted, with the result that it tightly gripped the article to which it had been applied and also conformed to its shape.

According to the prior art procedures, due to the fact that the gel cap was oversize and was freely disposed in its desired position, a certain degree of drying was necessary for the cap to begin to grip the neck so as to cause it to adhere sufficiently and permit manipulation of the capped article. This required preliminary drying before manipulating the caped article was a disadvantage for certain uses where a large number of articles had to be handled rapidly. Rapid driers for caps have been utilized, but such driers were expensive and offered only partial solution of the difficulties. Consequently, the difficulties and disadvantages just mentioned greatly restricted the market for said caps.

In order to overcome the above-mentioned inconvenience, it has been proposed to stretch the caps by means of stretching devices which, after the caps were positioned in place, were withdrawn. However, the caps were not sufficiently elastic, whereby upon stretching they were distorted and in many cases the distortion became permanent.

An object of this invention is to produce retractile articles, such as caps, bands, etc., formed of a polymeric synthetic resin and having sufficient and resilience so that they can be stretched and mounted in position on the article and upon withdrawal of the stretching force immediately contract to adhere sufficiently tightly and conform to the article to permit immediate handling of the article to which the retractile article is applied.

Another object of this invention is a method of manufacuring retractile articles, such as caps, bands, etc., of synthetic resins having improved plasticity and elasticity.

Other and additional objects will become apparent hereinafter.

The objects of the invention are accomplished in general, by incorporating into the gel polymeric synthetic resin retractile article, at some stage during its manufacture, a substance which imparts a high elongation and elasticity to the retractile article in the gel state and is miscible in large proportions with a non-solvent for the resin, is a solvent or swelling agent for the synthetic resin constituting the retractile article and sufficiently volatile to be eliminated during drying, i. e. upon the conversion of the moist gel article to the dry state.

In the preferred embodiment of the invention, an appropriate mold is immersed in a molding solution of the synthetic resin in a solvent which is miscible with a non-solvent for said resin in large proportions and is sufficiently volatile to be eliminated during drying of the gel product in its ultimate use. Upon withdrawal of the mold from the solution, a layer of the solution adheres thereto. The layer of solution, while on the mold, is then immersed in a bath containing a non-solvent for the resin and a solvent for the solvent of the resin solution, and preferably a bath containing the same resin solvent as that utilized in the molding solution in admixture with a non-solvent (for the resin) which is miscible with the solvent and is present in an amount so as to make the mixture of solvent and non-solvent a coagulating solution for the molding solution. As a consequence, the synthetic resin is coagulated in position on the mold. The coagulated resin article, after thorough washing, is stripped from the mold and maintained in the gel state, such as by being stored in water or packaged in impermeable containers, until said article is positioned in place in the ultimate use thereof.

The nature of the invention will become more apparent by reference to the following specific example, it being understood that the example is an illustrative embodiment of the invention and that the scope of the invention is not restricted thereto.

Example

An appropriately shaped cap mold is immersed in a 10% solution of polyvinyl chloride resin in acetonylacetone containing 0.5% tricresyl phosphate and traces of water (at most 0.2%). Upon withdrawal of the mold, a layer of the solution adheres thereto. The solution, while on the mold, is then immersed in a coagulating bath consisting of 85% to 90% acetonylacetone, 12% to 15% water, and 0.5% tricresyl phosphate. After thorough washing the coagulated cap, the latter is removed from the mold and maintained in the gel state, as by storing in water until used.

The cap produced by the above method shows an elasticity of up to 100%.

Though as shown by the example polyvinyl chloride resin is the preferred synthetic resin, it is to be understood that the invention is not restricted thereto. Any polymeric synthetic resin which is soluble in a solvent which is miscible in large proportions with a non-solvent for the resin and sufficiently volatile to be eliminated during conversion of the wet gel article to the dry state can be used. Preferably, the synthetic resin is water-insoluble since water is the preferred non-solvent for the resin.

As shown by the example, water constitutes the preferred non-solvent. However, the invention is not restricted to such specific non-solvent. Many other non-solvents which will be apparent to a person skilled in the art can be used. The quantity of non-solvent admixed with the solvent is such as to make such admixture a coagulating medium. If desired, a quantity of the non-solvent can be incorporated in the molding solution, provided such quantity does not materially affect the solvent power of the solvent.

The solvent which is employed both in the molding solution and in the coagulating bath is characterized in that it is miscible with a non-solvent for the synthetic resin, such as water, in large proportions and also sufficiently volatile to be largely eliminated during drying.

Derivatives of polyhydric alcohols, and particularly derivatives of glycols and glycerols, may be mentioned as resin solvents which have produced satisfactory results.

As derivatives of glycol which have given satisfactory results may be mentioned those having the following general formula:

wherein:

X is a radical of glycol;
R is a radical of a lower fatty acid and a halogen; and
R' is a hydroxyl group, a radical of a lower fatty acid, or an alkoxyl radical containing 1 to 2 C atoms.

As derivatives of glycerol which have given satisfactory results may be mentioned those having the following general formula:

wherein:

Y is a radical of glycerol;
R² is a radical of a lower fatty acid or a halogen;
R³ is a hydroxyl group, a radical of a lower fatty acid, or an alkoxyl radical containing 1 to 2 C atoms; and
R⁴ is a hydroxyl group, a radical of a lower fatty acid, or an alkoxyl radical containing 1 to 2 C atoms.

As specific illustrative examples of derivatives of glycols which have given satisfactory results may be mentioned acetonylacetone, monoformate of glycol, monoacetate of glycol, triacetate of glycol, and monochlorhydrin of glycol.

As specific illustrative examples of derivatives of glycerols which have given satisfactory results may be mentioned glycerol monoacetate, glycerol diacetate, glycerol triacetate, and glycerol monochlorhydrin.

It is to be understood that one or a plurality of the glycol derivatives or one or a plurality of the glycerol derivatives, or combination of both the derivatives of glycol and the derivatives of glycerol may be used.

It is to be noted that the solvent and the coagulating bath employed in this invention are neutral, stable and non-corrosive. For this reason, the aforementioned solvents are economical for use in actual operation.

The molding solution can also contain appropriate fillers, coloring agents, and resin plasticizers. Similarly, the coagulating bath can contain resin plasticizers. Whenever plasticizers are used, they are of the types which are soluble in the respective solution.

In another embodiment of the invention, a cap of the synthetic resin is produced in the known manner and, while said cap is in the gel state, it is impregnated with an aqueous solution containing a substance which imparts elasticity to the gel article, such as a resin swelling agent or solvent of the type and nature previously described, whereby the gel cap is impregnated with said substance. The cap is maintained in its gel state until at least it is positioned in place in its ultimate use, and thereafter the solvent or swelling agent is eliminated during the drying. Accordingly, the polymeric synthetic resin is impregnated with the elasticity- and resilience-imparting agent by this procedure just as it is impregnated with that agent by the method described in column 2 and illustrated by the example.

By means of a judicious choice of proportions, a choice that can be made by anyone skilled in the art, caps are obtained which possess elongations of rupture in all directions of from 30% to 100% in the moist state, and can be mounted, by virtue of said property, on bottle necks of many different dimensions by merely stretching them by means of appropriate apparatus. Immediately after having been placed in position, the caps contract and begin to take on the shape of the necks or articles.

Caps prepared according to this invention do not immediately contract fully. Full contraction is produced and obtained only upon complete drying. However, on stretching and placing the caps in position, they grip the article sufficiently to allow the latter to be handled without any trouble, for example for the purpose of wrapping.

During the drying process, both the water and the incorporated substance are eliminated, the cap loses its extensibility and cannot be removed from the neck of the bottle without being damaged, which prevents its being tampered with, Another advantage offered by the present invention is the possibility of applying caps of given dimensions to closures of bottles of various dimensions in much greater proportion than was possible with ordinary caps. This permits a reduction of the number of sizes that the manufacturer must have in stock. The result of this is a great simplification in manufacturing and the necessary material, a reduction in the cost price, and greater convenience for the user.

For convenience and brevity, the invention has been described specifically in connection with retractile caps. It is to be understood that the invention is not restricted thereto but is equally applicable to all types of retractile articles.

Since it is obvious that various changes and modifications may be made in the above description without departing from the nature or spirit thereof, this invention is not restricted thereto except as set forth in the appended claim.

We claim:

A method of making retractile articles, such as caps and bands for ultimate conforming attachments to objects and, having sufficient elasticity and resilience in the moist and gel state to permit stretching thereof and automatic return to a contracted state on withdrawing the stretching force, which comprises immersing a mold in a 10% solution of polyvinyl chloride resin in acetonylacetone containing 0.5% tricresyl phosphate, withdrawing said mold with a layer of said solution adhering thereto, coagulating the resin solution on said mold in a bath containing 85% to 90% acetonylacetone, 12% to 15% water and 0.5% tricresyl phosphate, said mold being of such size with respect to said objects to cause said objects to stretch substantially the coagulated articles against their inherent resiliency while in the moist or gel state, when said coagulated articles are applied to said objects in said state and maintaining said molded article in the moist and gel state until at least said article is positioned in place in its ultimate use.

RENÉ PICARD.
ANDRÉ BONNET.

REFERENCES CITED

The following references are of record in the file of this patent:

UNITED STATES PATENTS

| Number | Name | Date |
| --- | --- | --- |
| 2,112,717 | Snyder | Mar. 29, 1938 |
| 2,184,443 | Smith | Dec. 26, 1939 |
| 2,318,796 | Picard et al. | May 11, 1943 |
| 2,338,787 | Ushakoff | Jan. 11, 1944 |
| 2,428,527 | Plumb | Oct. 7, 1947 |